Figure 1:
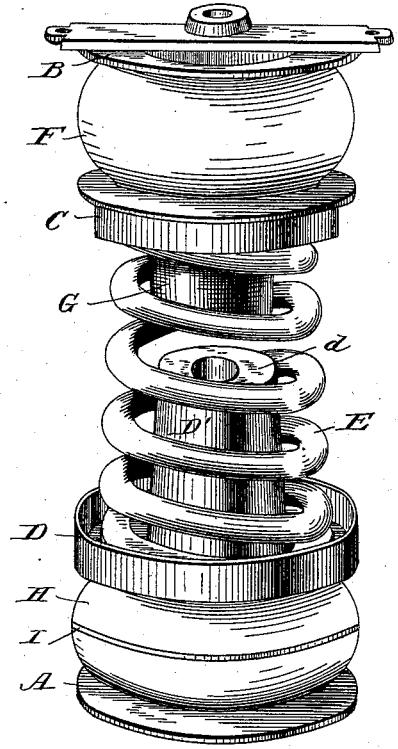

(No Model.)

R. VOSE.
CAR SPRING.

No. 347,281. Patented Aug. 10, 1886.

Witnesses:
H. N. Low
E. H. Dick

Inventor:
Richard Vose
by Marcellus Bailey
his attorney

UNITED STATES PATENT OFFICE.

RICHARD VOSE, OF NEW YORK, N. Y.

CAR-SPRING.

SPECIFICATION forming part of Letters Patent No. 347,281, dated August 10, 1886.

Application filed June 10, 1886. Serial No. 204,882. (No model.)

*To all whom it may concern:*

Be it known that I, RICHARD VOSE, of the city, county, and State of New York, have invented a certain new and useful Improvement in Car-Springs, of which the following is a specification.

My invention relates to that class of car-springs known as "rubber-center spiral springs," and is an improvement upon the spring described and claimed in my Patent No. 199,945, comprising, as it does, a steel spiral coil, in combination with an internal conical column of rubber of a length less than that of the spiral coil. In that patent, as well as in other patents granted me, I have shown and described the rubber column as composed of either one or two conically-shaped cores. In case of long spiral coils two rubber cores are employed; but to employ one conical rubber core requires either a shorter spiral coil or an elongation and attenuation of the single tapering rubber core, which is objectionable and is not calculated to produce the best results in a graduated car-spring. To obviate any such objections I employ but a single conical or tapering rubber core, which need not be of any greater length than usual, and which is inserted into one end of the external spiral coil, and I form or provide the metal cover of the other end of the spring with a central stand, which projects into the interior of the spiral coil, forming an elevated bearing, upon which the end of the rubber core will take when the spring is compressed to the proper point. I have also combined with the spring end cushions of rubber, which are external to the covers for the ends of the spiral coil. These cushions add much to the efficiency of the spring and materially check the transmission of noise or jar through the truck to the body of the car.

I am aware that in former patents, hereinbefore referred to, the rubber cores have been formed at their bases with circumscribing flanges. These flanges, however, are intended and have served to hold and assure the cores in place, and have exercised no appreciable action as springs. In the present instance, on the contrary, the spring-cushions are large and thick rubber heads, not flanges, but distinctively springs. I prefer to, and in practice do, strengthen and stay the cushions against undue lateral distention by incorporating with it a metal plate or disk, which lies in a plane at right angles to the line of compression of the spring. The union of the plate and rubber is effected by introducing the plate into the unvulcanized rubber cushion and then vulcanizing the rubber. For this purpose the plate may be perforated, so that the unvulcanized mass can be caused to enter and fill said perforations; or the plate may be brass or copper, or copper-plated, or steel or iron.

The nature of my improvement will be readily understood by reference to the accompanying drawings, in which—

Figure 2:
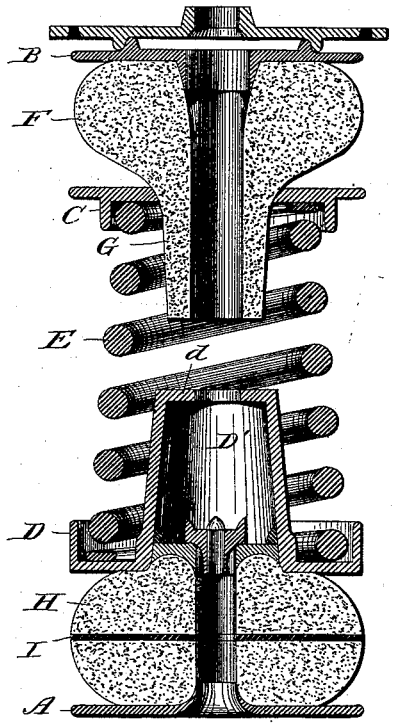
Figure 3:
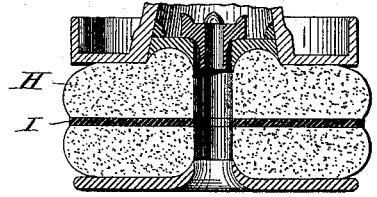

Figure 1 is a perspective view of a car-spring embodying the invention. Fig. 2 is a longitudinal central section of the same. Fig. 3 is a section of one of the rubber cushions, illustrative of the shape it takes under compression when it is provided with the stiffening or stay plate hereinbefore referred to.

A is the base-plate, and B is the cap, both of them being of ordinary or suitable construction.

C and D are the covers for the ends of the steel spiral coil E.

Between the cap and the upper cover, C, is interposed the large bulbous rubber head or cushion F, which in this instance is formed in one with the conical rubber core G. The cushion rests on the upper cover, C, and the core G extends down through the hole in the cover into the interior of the spiral coil. The coil shown in the drawings is of the length which usually takes two rubber cores, extending into the coil from opposite ends toward the center, as in my Patent No. 199,945, or from the center toward opposite ends, as in my Patent No. 330,445, and the rubber core G does not exceed in length that of one of such cores. Manifestly, therefore, it is too short to be of avail without some change in the construction and the relation of the other parts. This change is found in the lower cover, D, which is formed or provided with a central tubular stand, D', (preferably cast in one with said cover,) which extends up into the interior of the spiral coil a distance sufficient to bring its head $d$ into position to furnish a bearing on which the end of the rubber core can take at the proper point of compression of the spring. Between the base-plate and the lower cover, D, is interposed the spring-cushion H, essentially the same in construction as the upper cushion, F, save that it has no core such as G, and also has embedded or vulcanized in it the metal stiffening or stay plate I. I remark here, however, that this plate can be introduced into either or both of the cushions, whether the latter be provided with a core such as G, or not. The plate is introduced into the unvulcanized mass, which is molded around it into proper shape. If the plate be of copper or brass, the rubber, when vulcanized, will adhere strongly to it; and the same result can be attained with a steel or iron plate by preliminarily coating the same with a film of copper by electro-deposition or other suitable process; or the plate, of whatever metal it may be made, can be perforated at several points, so that the unvulcanized mass, when molded and pressed around it into shape, may enter and fill said perforations.

In the drawings the periphery of the plate is represented as flush with the exterior of the cushion; but, if desired, the plate can be of sufficiently less diameter to be entirely covered and concealed by the rubber. This plate adds very materially to the strength, efficiency, and durability of the cushion. As seen in Fig. 3, it restrains and prevents undue "squashing" or flattening out of the mass of rubber, and holds it in shape and condition to act to the best advantage.

Having now described my improvement and the manner in which the same is or may be carried into effect, what I claim as new and of my own invention is—

1. A rubber-center spiral spring comprising an external spiral coil, in combination with a conical rubber core extending from one end into the interior thereof and a cap or cover formed or provided with a stand extending into the interior of said coil from the opposite end thereof, and furnishing an elevated bearing within the body of the coil, on which the end of the core may take, as and for the purposes hereinbefore set forth.

2. The combined conical rubber core and spring-head, as distinguished from a flange, in combination with the spiral coil, as and for the purposes hereinbefore set forth.

3. The rubber spring-cushion provided with an internal metallic stiffening or stay plate, as and for the purposes hereinbefore set forth.

4. The combination of the spiral coil, the end covers therefor, and the spring rubber heads, as distinguished from flanges, interposed between said covers and the cap and base, respectively, as and for the purposes hereinbefore set forth.

In testimony whereof I have hereunto signed my name this 1st day of June, 1886.

RICHD. VOSE.

Witnesses:
R. T. VAN BOSKERCK,
M. BAILEY.